UNITED STATES PATENT OFFICE.

WILLIAM McKAY, OF OTTAWA, CANADA.

IMPROVEMENT IN CEMENTS.

Specification forming part of Letters Patent No. 132,973, dated November 12, 1872.

*To all whom it may concern:*

Be it known that I, WILLIAM MCKAY, of the city of Ottawa, in the county of Carleton, Province of Ontario and Dominion of Canada, have invented an Improved Process of Making and Manufacturing Hydraulic and Plastic Cement, of which the following is a specification:

The object of my invention is to produce hydraulic and plastic cements of different colors and various degrees of hardness, which can resist perfectly the action of water, moisture, or other causes of decay by exposure, from materials now having little or no commercial value or economic applications, such as shell or earthy marls, oyster-shells, road-dust, clay, and wood or coal ashes, as primary or basic ingredients, in combination with other materials, such as all kinds of waste or broken glass, crude or soluble glass, sand, quartz, feldspar, fluorspar, or infusorial earth, the silicious froth or waste matter of iron-furnaces, iron turnings or filings, anvil-dust or smith-ashes, carbonate of magnesia, sulphite of lime, oxide of manganese or magnesian rock, as secondary ingredients.

Cements made with the above-mentioned basic ingredients, and any one or more of each class of the secondary materials, are especially valuable for the manufacture of artificial stone, and suitable for the molding of architectural and ornamental objects, the lining or building of water-tanks, drains, sewers, and water-pipes, the construction of pavements, and for all other purposes to which hydraulic and plastic cements are used.

When the cement is to be applied in positions exposed to the action of the atmosphere, and when it is desired to preserve the purity of its color, it is preferable to use none of the iron oxides in its composition in order to avoid its oxidation; but when it is to be applied under water or in sheltered positions, their use is recommended.

To produce a hard, durable, and quickly-setting cement, I make a compound of marl or oyster-shells, clay, road-dust, wood or coal ashes, (or equivalent alkalies,) in combination with metallic oxides and carbonates in certain proportions, which may vary according to the requirements of the cement, but which, for all practical purposes, may be as follows:

| | |
|---|---|
| Marl or oyster-shells | 50 parts. |
| Clay or road-dust | 20 " |
| Coal or wood ashes, (or equivalent alkalies) | 5 " |
| Sand, soluble or other glass, or any one or more of the silicious ingredients | 5 " |
| Any one or more of the metallic oxides | 10 " |
| Carbonate of magnesia, or calcined magnesian rock | 10 " |
| | 100 parts. |

All the above-mentioned ingredients, with the exception of soluble glass and ashes or alkalies, are mixed together with water and ground to a powder in a mortar-mill or by any convenient process, after which the whole is brought to a liquid state by the addition of water. The compound is then run into tanks and left to precipitate. When the precipitation has taken place the excess of water is withdrawn, and the ashes or alkalies are added and thoroughly mixed and incorporated with the compound. The whole is then dried either by artificial heat or in the open air, after which it is thoroughly calcined and ground to an impalpable powder in a flour-mill or by any other process. The soluble glass, previously powdered, is then added and incorporated with the compound, which is ready for use in the same manner as other hydraulic or plastic cements.

I do not confine myself to the proportions above given, or to any proportions, as they may be varied according to the required quality of the cement; but they are given as an example of proportions which may be adopted with good results.

When marl is not procurable, ground oyster-shells, either raw or calcined, or common lime, may be substituted therefor and combined with the other ingredients. Such oyster-shells may be employed in the same proportion as marl, and the proportions of the other ingredients preserved; but when lime is substituted for the marl the proportion of carbonate of magnesia is increased to between fifteen and twenty per cent. of the whole.

When wood or coal ashes are not procurable, potash or soda may be used as an equivalent.

When road-dust is employed—such dust being largely composed of calcareous matter, and being of very convenient use as it is already reduced to powder—the quantity of marl, oyster-shells, clay, or any of the lime carbonates, may be reduced from ten to fifty per cent. of the proportions above given without altering the result of the combination or the quality of the cement; and if such road-dust holds but a small proportion of clay, one or more parts of clay must be added, so as to bring the total quantity thereof in the compound to about twenty per cent. of the whole.

By the calcination of the compound the woody fibers which may be present in any of the ingredients are converted into carbon, which renders the cement particularly valuable for the construction of water-tanks, as such carbon has the effect of purifying the water.

Having thus described my improvements on the manufacture of hydraulic and plastic cements, what I claim is—

A cement consisting of shell, clay, iron oxides, and lime carbonates ground together, then dissolved in water and left to precipitate, the resultant then mixed with alkali, dried, calcined, and ground to a powder; this mixture then incorporated with ground glass or sand, as set forth.

WILLIAM McKAY.

Witnesses:
WILLIAM WILSON, M. D., *Advocate*.
TOUSSAINT G. COURSOLLES.